Figure 1:
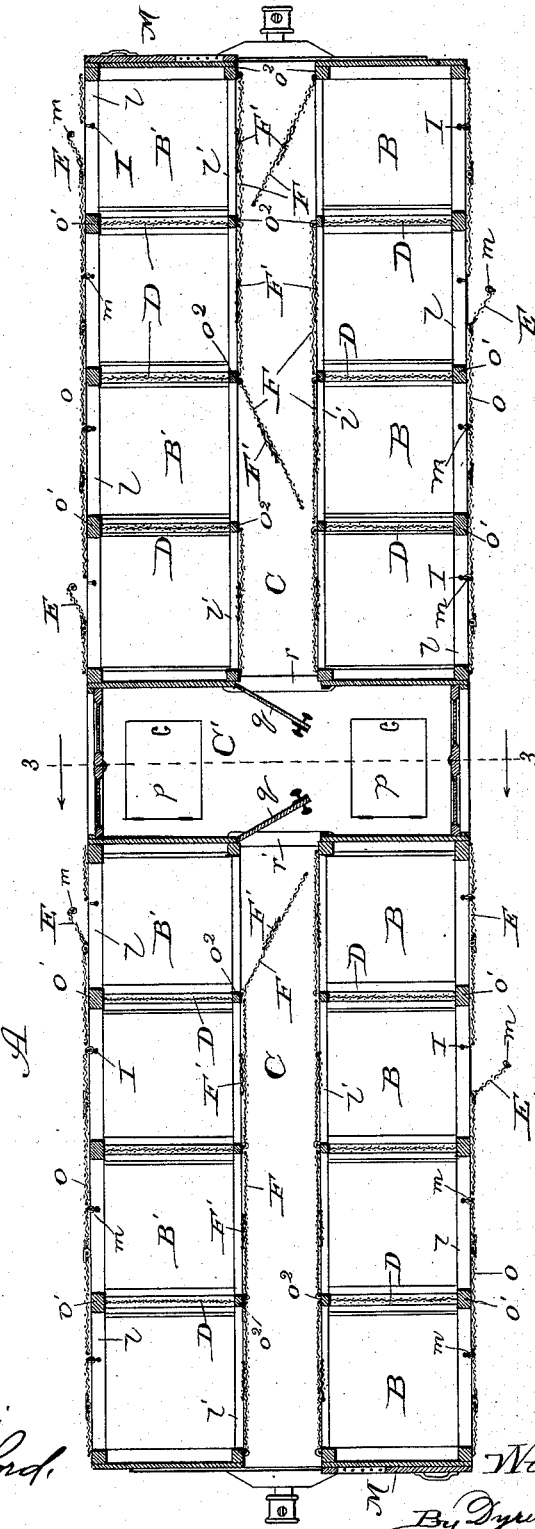

(No Model.) 4 Sheets—Sheet 3.

W. P. JENKINS.
POULTRY CAR.

No. 384,913. Patented June 19, 1888.

Witnesses:

Inventor:
William P. Jenkins,
By Dyrenforth & Dyrenforth,
Att'ys (No Model.) 4 Sheets—Sheet 4.

W. P. JENKINS.
POULTRY CAR.

No. 384,913. Patented June 19, 1888.

Witnesses:
C. E. Gaylord
J. H. Dyrenforth

Inventor:
William P. Jenkins.
By Dyrenforth & Dyrenforth,
Att'ys

UNITED STATES PATENT OFFICE.

WILLIAM P. JENKINS, OF CHICAGO, ILLINOIS, ASSIGNOR TO THE JENKINS LIVE POULTRY CAR COMPANY, OF SAME PLACE.

POULTRY-CAR.

SPECIFICATION forming part of Letters Patent No. 384,913, dated June 19, 1888.

Application filed April 17, 1888. Serial No. 270,890. (No model.)

*To all whom it may concern:*

Be it known that I, WILLIAM P. JENKINS, a citizen of the United States, residing at Chicago, in the county of Cook and State of Illinois, have invented a new and useful Improvement in Live-Poultry Cars, of which the following is a specification.

My present invention relates to improvements in the live-poultry car shown and described in Reissued Letters Patent of the United States No. 10,633, dated August 4, 1885. The car, as set forth in the aforesaid Letters Patent, is designed to afford a means more humane and economical than the means previously provided for shipping live poultry, and to this end involves, broadly stated, a car divided internally into tiers of compartments opening at opposite sides of the car, to which compartments, containing the poultry to be shipped, access may be had from without the car for feeding, watering, and cleaning purposes, and to introduce and withdraw the poultry.

Before the invention of the live-poultry car forming the subject of the aforesaid Letters Patent it was common to ship live poultry in coops, which were piled into the cars. This manner of shipment subjected the poultry to cruelty, inasmuch as it afforded no way of feeding and watering them properly, and entailed the killing of a large proportion of the shipment, not only by lack of care, but to a great extent by the rough usage to which they were subjected on the route by the bumping of cars in the train in switching, &c., which excited the natural tendency of the fowls to "pile" in their coops and thereby cause injury to and killing of many. I find that in order to permit the shipment of live poultry without any such undesirable consequences as those stated as being incident to the common manner of shipment, or at least to reduce to the minimum the extent of such consequences by the improved system of transportation, for practicing which means are set forth in the aforesaid Reissued Letters Patent, it is necessary to have each of the compartments into which the car is divided internally of a size to accommodate only so many fowls that there will be very little, if any, danger of their piling or of injury or loss by piling.

A principal object of my present improvement is to afford compartments within the car of the desired dimensions referred to. This I am enabled to do by providing a longitudinal aisle centrally through the car about two feet in width, thereby (the ordinary width of the car being about nine feet) leaving the tiers of compartments on opposite sides of the aisle a little more than or about three feet in width, or in the directions transverse to the aisle, the other dimensions of the compartments being given in the description of the details of construction hereinafter contained. The aisle enables me to provide the required width of compartment transverse of the car, and at the same time affords means for ventilation, which is essential, and for access from within the car to the compartments and poultry contained therein through suitable doors or openings controlled from the aisle, whereby the compartments may be cleaned and the poultry fed and watered and properly cared for on the route; and, if desired, the car may be side-tracked at its destination and used as a market from which to dispose of the poultry. When the aisle is not provided, as in the construction presented in the aforesaid Reissued Letters Patent, the compartments cannot be made of the required transverse width without wasting the space I utilize to produce an aisle; nor, of course, would there be the desired ventilation and the possibility of access to the compartments from within the car with all the advantages incident to such accessibility.

A further object of my improvement is to render the floors or decks of the compartments capable of being raised and lowered by making "drop-decks" of them, whereby the poultry in upper compartments of each tier may be let into and removed from a lower compartment, and whereby, also, the decks may be dropped to convert the entire space containing a tier of compartments into one undivided space accessible for cleaning the decks without requiring the latter to be removed for the purpose; and it is further my object to provide a generally-improved construction of live-poultry car.

To these ends my invention consists in a live-poultry car divided internally into tiers of compartments opening laterally of the car, and an aisle within the car longitudinally thereof and separating the tiers of compartments, normally closed to the aisle, into two sets, controllably accessible from the aisle.

It also consists in the general and specific constructions of details and in combinations of parts.

Figure 2:
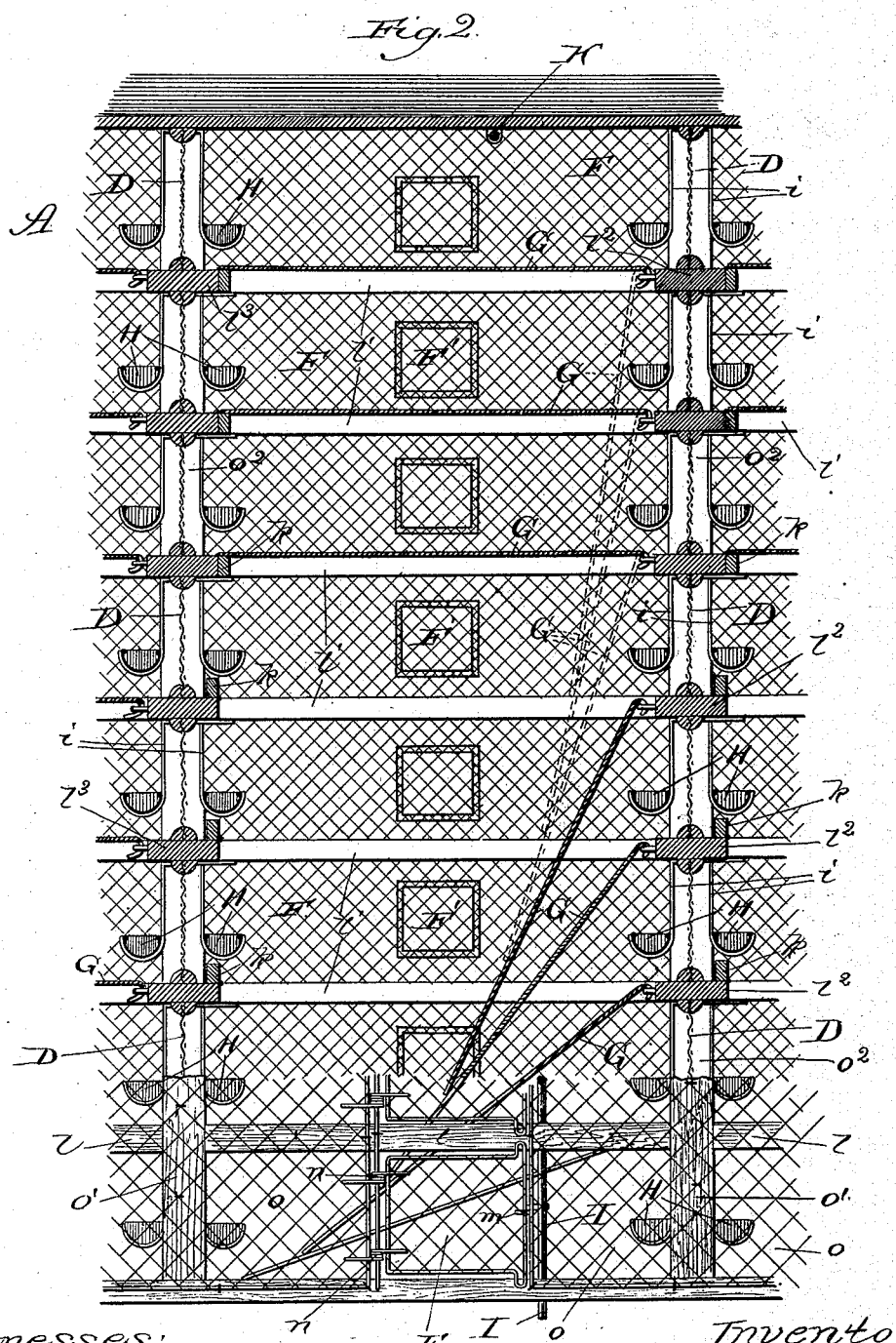
Figure 3:
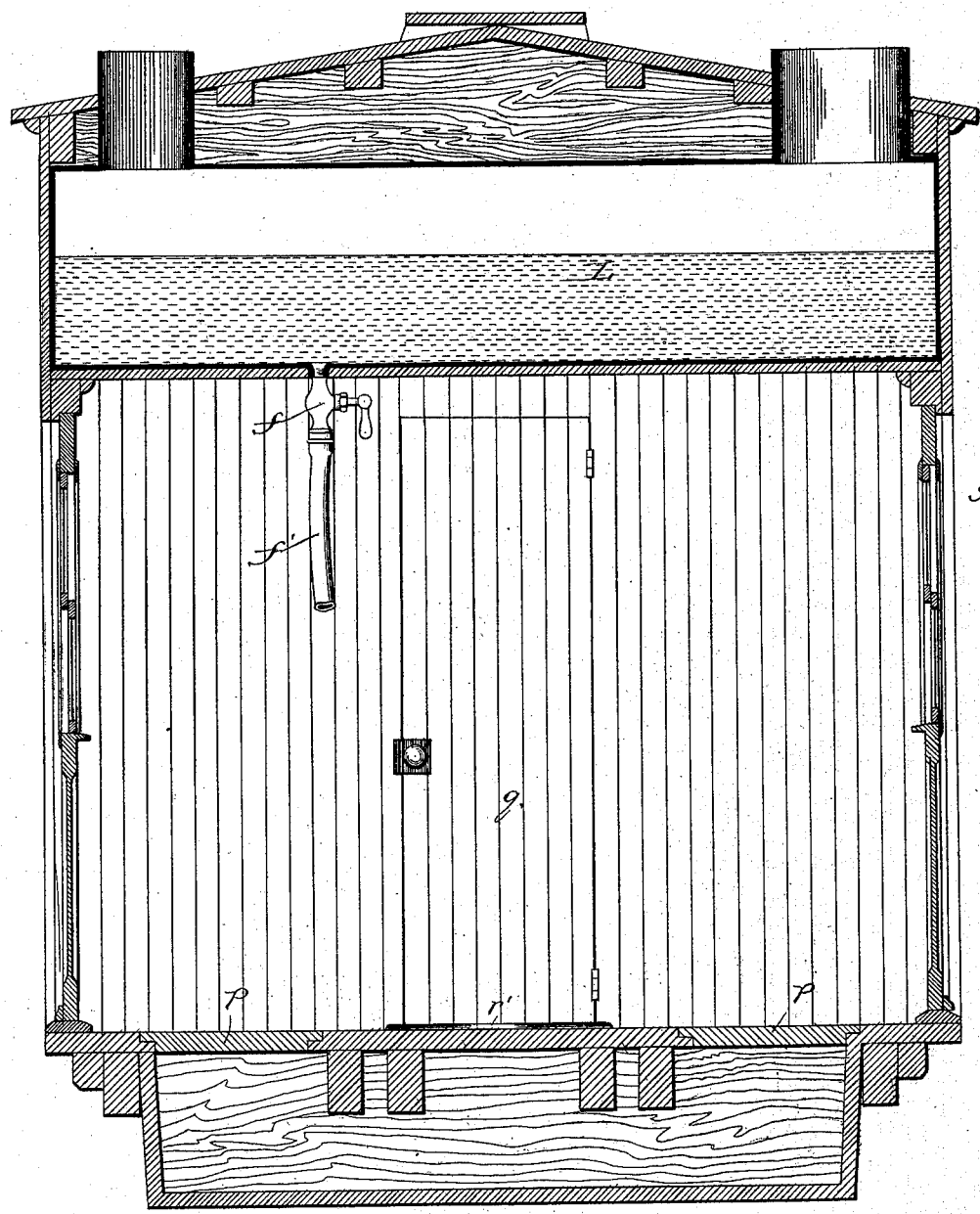
Figure 4:
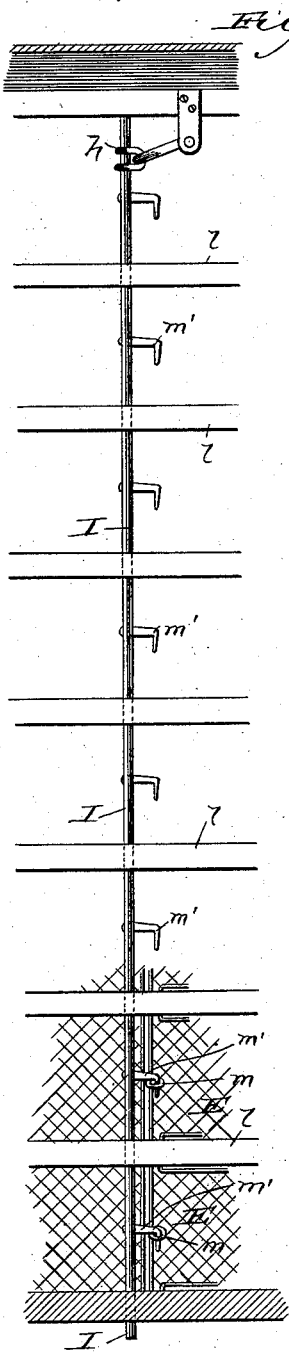
Figure 5:
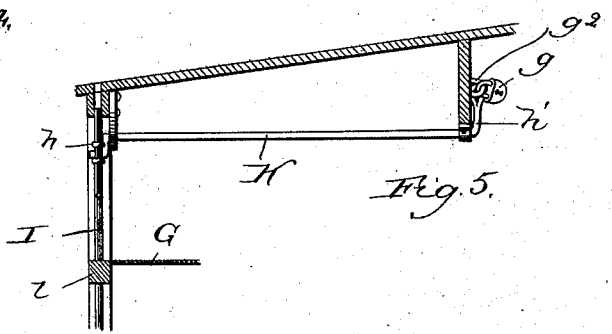
Figure 6:
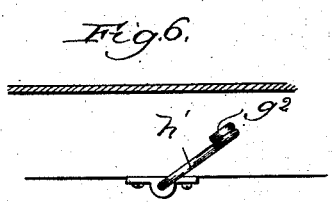
Figure 7:
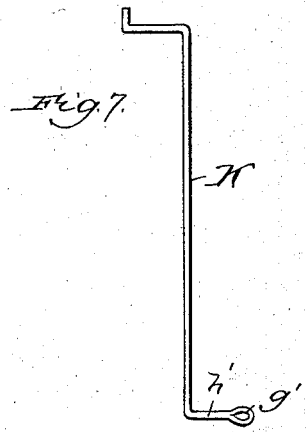

In the drawings, Figure 1 is a sectional plan view of my improved car, the section being taken through any plane of compartments between the roof and floor of the car and below the feed and water troughs with which the compartments are provided at their sides. Fig. 2 is an enlarged view of a portion of the car between the ends thereof, showing a tier of the compartments, the lowermost and part of the one above it being shown in elevation from an outer side of the car and the others in section, having the outer side of the car, of open wire-work, removed to display the farther or inner sides of the compartments adjacent to the longitudinal aisle. Fig. 3 is an enlarged transverse section on the line 3 3 of Fig. 1 through the car at the transverse aisle thereof, affording an apartment for the attendant, and having a water-reservoir along its ceiling. Fig. 4 is a view in broken elevation, showing means for locking or unlocking simultaneously all the outer doors at the side of a car of one tier of the compartments; Fig. 5, a view of a broken portion of the car, showing the horizontal crank-rod connected with the vertical door-locking rod, which crank-rod is actuated by turning it to raise or lower the locking-rod to open or lock the outer doors of a tier of the compartments; Fig. 6, an end view of the crank-rod in operative position, and Fig. 7 a view in elevation of the crank-rod.

A is the live poultry car, which may be of the general shape of an ordinary box-car, but which, instead of being, like the latter, closed on all sides, is formed with open-work on its sides, and preferably, as shown, with open wire-work. The car is divided internally into compartments separated by an aisle, C, extending longitudinally through the car, into two lateral sets, B and B', each set comprising a number of tiers separated from each other by open partitions D, preferably of wire-work, as shown. The compartments are further divided at or near the center of the car by a transverse aisle, C', which may be used as a room for an attendant, and which is surmounted by a water-reservoir, L, Fig. 3, provided between the ceiling of the aisle and roof of the car, and accessible for supplying it from the roof. Doorways $r$ and $r'$ lead into the aisles C and C' and are provided with doors $q$, which open into the transverse aisle, the floor of which may be provided with trap-doors $p$, leading into storage-boxes (not shown) below the car.

Each tier of compartments B and B' is inclosed at the sides of the car by wire net-work $o$, fastened at intervals to the vertical posts $o'$ of the car-frame, and provided with wire doors E, opening outwardly and tending normally to close by means of stiff springs $n$ at their hinged edges, and the free edges of the doors E are provided with staples $m$. Each tier of compartments is provided on its inner side, or side adjacent to the aisle C, with an open-work or wire door, F, hinged to a post, $o^2$, to open into the aisle, but closing the entire tier, and at each compartment its door F has an opening closed by a door, F', supported at its upper edge upon the wire of the door F on the inner side of the latter, and thus normally closed by its own gravity and opened by swinging it into the adjacent compartment, as by inserting the hand.

Each compartment is formed with a rectangular horizontal wooden frame composed of the timbers $l\ l'$ and $l^2\ l^3$, joined together and supported on the posts $o'\ o^2$, and has a drop deck or floor, G, preferably of galvanized sheet metal, hinged at one edge, as shown, to a timber, $l^2$, and resting at its opposite edge upon a cleat, $k$, hinged to the timber $l^3$ of the compartment-frame in a manner to permit it to be raised, as represented in the third, fourth, and fifth compartments, counting from the bottom. (Shown in Fig. 2.) The decks G fit between the side timbers, $l\ l'$, and extend short of the timbers $l^3$, whereby, when not supported at their edges opposite those at which they are hinged by the cleats $k$, they drop on their hinges, as indicated by dotted and full lines in Fig. 2. Owing to the manner of hanging of the decks by open hinges, as shown, they are readily removable to be taken away, if desired, for cleaning purposes, and, being removable, the entire space of a tier may be loaded with return freight.

Troughs A are provided at the sides of the compartments, being supported in hangers $i$, secured underneath the timbers $l^3$, each of which, as will be noticed, is sufficiently wide to afford one side of the frame of a compartment in one tier and the adjacent side of a compartment in the next tier. The troughs may be slid into their hangers from the aisle C and withdrawn into the latter, to be replenished with feed through the wire doors F, sufficient space (not shown) being left in the network of the doors to admit the troughs endwise.

All the doors E of a vertical tier of compartments may be simultaneously locked or unlocked by means of a vertical longitudinally-reciprocating rod, I, having rigid hooks $m'$ extending from it horizontally at intervals to engage with the staples $m$ when the rod is down, thus locking the doors, and release the latter to permit them to be opened against the resistance of the springs $n$ when the rod is raised to free the staples from the hooks. Each rod I has an eccentric, $h$, near its upper end engaged by one crank end of a rod, K, suitably supported and extending horizontally into the aisle C, where it is provided with an arm or handle, $h'$, accessible to the reach, and which may be locked by a padlock, $g$, passed through an eye, $g'$, in the end of the handle portion and through an adjacent staple, $g^2$.

The water-tank L over the transverse aisle or apartment C' is provided with a controllable outlet, $f$, having a rubber hose extension, $f'$, by means of which the attendant may supply the troughs H with water by way of the aisle C and throughout the entire car.

At opposite ends of the car and aisle C are sliding doors M, of a common construction, one vertical half or other portion being solid and the remainder provided with vertical rods or other open-work, whereby when it is desired to close the aisle to the outer air the solid portion is brought coincident with the aisle-opening, and to permit ventilation the open portion is brought coincident therewith.

It will thus be seen that the construction described affords a poultry-car in all respects convenient, effective, and desirable for the purposes intended and hereinbefore stated.

As shown, each tier is composed of eight compartments intended for chickens, and each compartment is about four feet lengthwise of the car, one foot high, and, as before stated, three feet crosswise of the car. The first and last mentioned dimensions always may remain the same, though its height may be changed for adapting the compartments to receive large species of fowl—such as turkeys—when, of course, the number of compartments in a tier is reduced accordingly.

The doors F permit access of the attendant to the inclosures containing the tiers of compartments, (the decks being dropped for the purpose,) especially to permit cleaning. The doors F' permit the insertion and withdrawal from the aisle of fowls from the compartments thus from within the car, and the doors E permit the desired access from without the car. The car may be thoroughly ventilated, and perfect care may be taken of the poultry on the route, the attendant being provided with adequate quarters in the aisle or apartment C', and as several or all of the poultry-cars in a train may be accessible one from the other through the doorways at the ends of the aisles C' a single attendant may take care of several cars.

While it is not so desirable, it is within the spirit of my invention to have only one set of the tiers of compartments, as B, accessible from the outside of the car and aisle C, and the other from the aisle only.

What I claim as new, and desire to secure by Letters Patent, is—

1. A live-poultry car comprising, in combination, a car divided internally into tiers of compartments opening laterally of the car, and a longitudinal aisle within the car separating the tiers of compartments into two sets normally closed to and controllably accessible from the aisle, substantially as described.

2. A live-poultry car comprising, in combination, a car, A, divided internally into tiers of compartments opening laterally of the car and provided with doors E, a longitudinal aisle, C, within the car, separating the tiers of compartments into two sets, B and B', and doors for the said compartments, opening into the aisle C, substantially as described.

3. A live-poultry car comprising, in combination, a car, A, divided internally into tiers of compartments having their sides formed with open-work, substantially as described, and opening laterally of the car, doors E for the compartments in the open-work at opposite sides of the car, a longitudinal aisle, C, within the car, separating the tiers of compartments into two sets, B and B', an open-work door, F, for each tier, opening into the aisle C, and doors F' in the doors F, substantially as described.

4. A live-poultry car comprising, in combination, a car, A, divided internally into tiers of compartments opening laterally of the car and provided with doors E, a longitudinal aisle, C, within the car, separating the tiers of compartments into two sets, B and B', doors F for the said compartments, opening into the aisle C, and troughs H, supported in the compartments and removable from and adjustable into the said compartments from the aisle through the doors F when closed, substantially as described.

5. A live-poultry car comprising, in combination, a car, A, divided internally into tiers of compartments opening laterally of the car, a longitudinal aisle, C, within the car, separating the tiers of compartments into two sets, B and B', normally closed to and controllably accessible from the aisle, troughs H in the compartments, and a stationary water-supply tank, L, provided with means for leading water from it to the compartments, substantially as described.

6. A live-poultry car comprising, in combination, a car, A, divided internally into tiers of compartments opening laterally of the car, a longitudinal aisle, C, within the car, separating the tiers of compartments into two sets, B and B', normally closed to and controllably accessible from the aisle, troughs H in the compartments, a transverse aisle, C', crossing the aisle C, and a stationary water-supply tank, L, above the aisle C', and provided with means for leading water from it to the compartments, substantially as described.

7. A live-poultry car comprising, in combination, a car, A, divided internally into tiers of compartments opening laterally of the car and provided with doors E, having staples $m$, a longitudinal aisle, C, within the car, separating the compartments into two sets, B and B', doors for the said compartments, opening into the aisle C, a vertically-reciprocating rod, I, for each tier, having hooks $m'$, to engage with the staples $m$, and a crank-rod, K, for each rod I connected therewith and extending into the aisle C, substantially as described.

8. A live-poultry car comprising, in combination, a car, A, divided internally into tiers of compartments having hinged drop decks G and opening laterally of the car, and a longitudinal aisle, C, within the car, separating the tiers of compartments into two sets, B and B', normally closed to and controllably accessible from the aisle, substantially as described.

9. A live-poultry car comprising, in combination, a car, A, divided internally into tiers of compartments having hinged drop-decks G and hinged supports $k$ for the free ends of the drop-decks and opening laterally of the car, and a longitudinal aisle, C, within the car, separating the tiers of compartments into two sets, B and B', normally closed to and controllably accessible from the aisle, substantially as described.

WILLIAM P. JENKINS.

In presence of—
J. W. DYRENFORTH,
CLIFFORD N. WHITE.